United States Patent
Wang et al.

(10) Patent No.: US 6,757,242 B1
(45) Date of Patent: Jun. 29, 2004

(54) SYSTEM AND MULTI-THREAD METHOD TO MANAGE A FAULT TOLERANT COMPUTER SWITCHING CLUSTER USING A SPANNING TREE

(75) Inventors: Jenlong Wang, Los Altos, CA (US); Hungjen (Sean) Yang, San Jose, CA (US); Bruce Schlobohm, Fremont, CA (US); William H. Swortwood, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/538,264

(22) Filed: Mar. 30, 2000

(51) Int. Cl.[7] .............................................. G01R 31/08
(52) U.S. Cl. ........................ 370/216; 370/217; 370/242; 370/244; 370/248; 370/256
(58) Field of Search ................................ 370/216, 217, 370/219, 220, 221, 223, 224, 225, 227, 228, 242, 244, 247, 248, 250, 251, 254, 256

(56) References Cited

U.S. PATENT DOCUMENTS

| | | | |
|---|---|---|---|
| 5,859,959 A | * | 1/1999 | Kimball et al. ................. 714/4 |
| 6,219,739 B1 | * | 4/2001 | Dutt et al. .................... 710/311 |
| 6,570,881 B1 | * | 5/2003 | Wils et al. .................... 370/410 |
| 6,578,086 B1 | * | 6/2003 | Regan et al. ................. 709/242 |
| 6,581,166 B1 | * | 6/2003 | Hirst et al. ...................... 714/4 |
| 6,678,241 B1 | * | 1/2004 | Gai et al. .................... 370/216 |

* cited by examiner

*Primary Examiner*—Phirin Sam
(74) *Attorney, Agent, or Firm*—Schwegman, Lundberg, Woessner & Kluth, P.A.

(57) ABSTRACT

A system, method and computer program to detect and recover from a communications failure in a computer network. The computer network has several nodes which include processor-based systems, input/output controllers and network controllers. Each node has a cluster adapter connected to multiple port switches through communications links. Data is transmitted through among the nodes through the communications links in the form of packets. A fabric manager module will monitor the network and detect a link failure. Upon the detection of a link failure between two switches a spanning tree partitioning module will partition the network into two trees at the point of the link failure. Thereafter, a link and switch identification module will identify a link between the two trees that can replace the failed link and has the least impact on the network. A routing table calculation algorithm module will calculate a new routing and distance table based on the identified link. The fabric manager module will then download the routing and distance table to only those switches effected by the new link selected to replace the failed link. This identification and recovery from communications link failures may be done with little overhead and without taking the network offline.

27 Claims, 12 Drawing Sheets

FIG. 10

| DISTANCE | TO MacId=1 | 2 | 3 | 4 | 5 | 6 | 7 | 8 | 9 | 10 | 11 | 12 | 13 | 14 |
|---|---|---|---|---|---|---|---|---|---|---|---|---|---|---|
| FROM MacID=1 | 0 | In | | | | | | | | | | | | |
| 2 | In | 0 | | | | | | | | | | | | |
| 3 | | 0 | 0 | In | | | | | | | | | | |
| 4 | | | In | 0 | | | | | | | | | | |
| 5 | | | | | 0 | In | 1(a) | 2(b) | | | | | | |
| 6 | | | | | In | 0 | 2(b) | 1(a) | | | | | | |
| 7 | 1(a) | 2(b) | 1(c) | 2(b) | 1(c) | 2(d) | 0 | 2(e) | | | | | | |
| 8 | | | | | | | 1(a), 2(h) | 1(d), 2(e) | 1(h) | 2(g) | 2(f) | 1(g) | 2(f) | 1(e) |
| 9 | | | | | | | 1(a) | 0 | 0 | In | | | | |
| 10 | | | | | | | 2(b) | 1(b) | In | 0 | | | | |
| 11 | | | | | | | 2(a) | 2(a) | | | 0 | In | | |
| 12 | | | | | | | | 1(d) | | | In | 0 | | |
| 13 | | | | | | | | | | | | | 0 | In |
| 14 | | | | | | | | | | | | | In | 0 |

| DISTANCE FROM MacID=1 | TO MacID d=1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 2 | In | 0 | 2 | 4 | 3 | 4 | 1 | 2 | 2 | 3 | 3 | 3 | 4 | 3 |
| 3 | 2 | 3 | 0 | 5 | 4 | 5 | 2 | 3 | 3 | 4 | 4 | 4 | 5 | 4 |
| 4 | 4 | 5 | In | 3 | 4 | 1 | 2 | 2 | 4 | 3 | 3 | 3 | 4 | 3 |
| 5 | 3 | 3 | 3 | 0 | In | 3 | 1 | 2 | 4 | 5 | 5 | 3 | 4 | 3 |
| 6 | 4 | 4 | 4 | In | 0 | 2 | 3 | 4 | 4 | 5 | 4 | 2 | 3 | 2 |
| 7 | 1(a) | 2(b) | 1(c) | 3(d) | 2(d) | 3(d) | 0 | 1(d), 2(e) | 1(h) | 2(g) | 2(f) | 2(d) | 3(d) | 2(d) |
| 8 | 2(a) | 3(a) | 2(a) | 2(b) | 1(c) | 2(d) | 1(a), 2(h) | 0 | 2(a) | 3(a) | 3(a) | 1(g) | 2(f) | 1(e) |
| 9 | 2 | 3 | 2 | 4 | 3 | 4 | 1 | 2 | 0 | In | 3 | 3 | 4 | 3 |
| 10 | 3 | 4 | 3 | 5 | 4 | 5 | 2 | 3 | In | 0 | 4 | 4 | 5 | 4 |
| 11 | 3 | 4 | 3 | 5 | 4 | 5 | 2 | 1 | 3 | 4 | 0 | In | 5 | 4 |
| 12 | 3 | 4 | 3 | 3 | 2 | 3 | 3 | 2 | 3 | 5 | 5 | In | 3 | 2 |
| 13 | 4 | 5 | 4 | 4 | 3 | 4 | 2 | 1 | 4 | 5 | 5 | 3 | 0 | In |
| 14 | 3 | 4 | 3 | 3 | 2 | 3 | 2 | 1 | 3 | 4 | 4 | 2 | In | 0 |

| DISTANCE | TO MacId=1 | 2 | 3 | 4 | 5 | 6 | 7 | 8 | 9 | 10 | 11 | 12 | 13 | 14 |
|---|---|---|---|---|---|---|---|---|---|---|---|---|---|---|
| FROM MacID=7 | 1(a) | 2(b) | 1(c) | 4(e) | 3(e) | 4(e) | 0 | ~~1(e)~~, 2(e) | 1(h) | 2(g) | 2(f) | 3(e) | 4(e) | 3(e) |
| 8 | 3(h) | 4(h) | 3(h) | 2(b) | 1(c) | 2(d) | ~~1(e)~~, 2(h) | 0 | 3(h) | 4(h) | 3(h) | 1(g) | 2(f) | 1(e) |

SYSTEM AND MULTI-THREAD METHOD TO MANAGE A FAULT TOLERANT COMPUTER SWITCHING CLUSTER USING A SPANNING TREE

FIELD

The invention relates to a system and multi-thread method to manage a fault tolerant computer switching cluster using a spanning tree.

BACKGROUND

In the rapid development of computers many advancements have been seen in the areas of processor speed, throughput, communications, and fault tolerance. Initially computer systems were standalone devices in which a processor, memory and peripheral devices all communicated through a single bus. Later, in order to improve performance, several processors and were interconnected to memory and peripherals using one or more buses. In addition, separate computer systems were linked together through different communications mechanisms such as, shared memory, serial and parallel ports, local area networks (LAN) and wide area networks (WAN). However, these mechanisms have proven to be relatively slow and subject to interruptions and failures when a critical communications component fails.

One type of architecture of many that has been developed to improve throughput, allow for parallel processing, and to some extent, improve the robustness of a computer network is called a hypercube. Hypercube is a parallel processing architecture made up of binary multiples of computers (4, 8, 16, etc.). The computers are interconnected so that data travel is kept to a minimum. For example, in two eight-node cubes, each node in one cube would be connected to the counterpart node in the other. However, when larger numbers of processors and peripheral devices are included in the network, connecting each node, which includes processors and peripheral devices, to all other nodes is not possible. Therefore, routing tables for data must be established which indicate the shortest path to each node from any other node.

A hypercube like architecture, and many other types of networks and computer architectures, work well when all the components are operating properly. However, if a failure occurs to a node, switch, bus or communications line, then an alternate path for data will have to be determined and the routing or distance table would have to be computed again. If this failure occurs to a centrally located node, switch, or communications links, then the impact to the network would be more significant and in some configurations, possibly as much as half the network would not be able to communicate to the other half. Such a situation may require taking the network offline and reconfiguring the communications links as well as computing a new routing or distance table. Of course, taking a network offline or losing communications to a portion of a network is highly undesirable in a business, academic, government, military, or manufacturing environment due at least to the loss in productivity and possible even more dire consequences.

Therefore, what is needed is a system and method that will, upon initial set up of a computer network, determine the optimal routing of data for any configuration of a computer network having any number of processors, computers and peripherals, referred to as nodes, so as to create the shortest possible distances between nodes. Further, this system and method should, upon the detection of a switch or node failure, be able to identify a substitute link which has the least impact on the network and the routing or distance table used to transmit data. The system and method should also be able to switch to the substitute link with minimal impact to the operation of the network and without taking the entire network offline.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 10 is an example of a distance and routing table showing an initial distance matrix generated for the NGIO architecture shown in FIG. 3 and the spanning tree shown FIG. 4 generated using the example embodiments of the present invention;

FIG. 11 is an example of the distance table shown in FIG. 10 after determination of the shortest distances for all nodes shown in FIG. 3 and the spanning tree in FIG. 4 by the example embodiments of the present invention; and FIG. 12 is a portion of the example distance table shown in FIG. 11 in which only the rows and columns that need to be modified as a result of the link failure, exemplified by FIG. 5, using an alternate link that is determined to have the least possible impact on the distance table by the example embodiments of the present invention.

DETAILED DESCRIPTION

Figure 1:
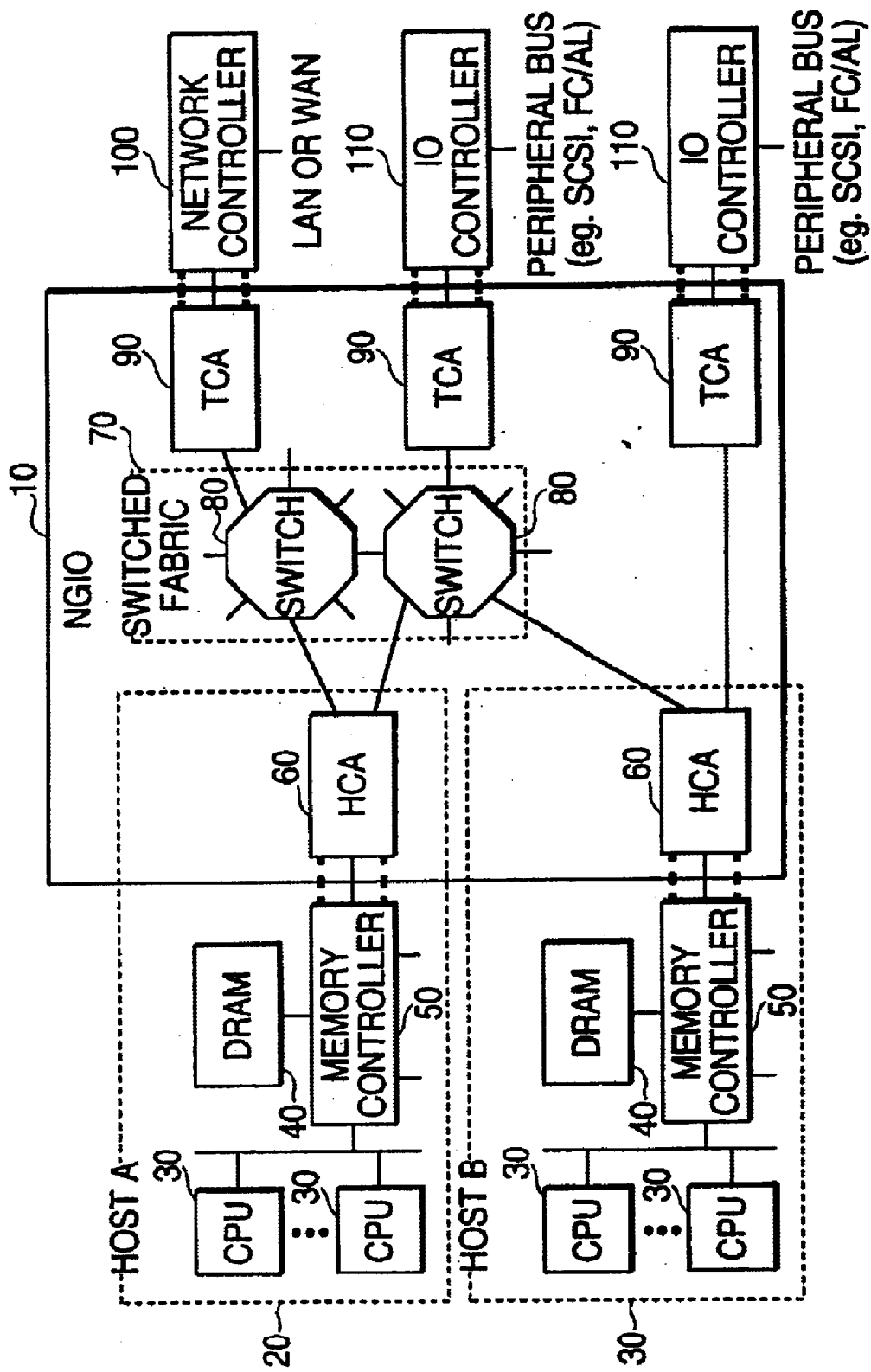
FIG. 1 is an example of an overall Next Generation Input/Output (NGIO) systems diagram.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/ values/ ranges may be given, although the present invention is not limited to the same. As a final note, well-known components of computer networks may not be shown within the FIGS. for simplicity of illustration and discussion, and so as not to obscure the invention.

The present invention is directed to a method of detecting and recovering from a communications failure in a network. This method starts by detecting a link failure among many links connecting several nodes and several switches in a network. Then the method partitions the network into two trees at the point of the link failure. Thereafter, a link is identified among the many links that will establish communications between the two trees and will impact a minimum number of switches. A routing and distance table is then updated that has a shortest distance between each node of the many nodes based on the link identified. The routing and distance table is then downloaded to the minimum number of switches impacted by the link identified.

FIG. 1 is an example of an overall Next Generation Input/Output (NGIO) 10 systems diagram which may be used by the embodiments of the present invention. Using such an NGIO 10 architecture it may be possible to link together a processor based system 20, through switches 80 to several Input/Output (I/O) controllers 110, network controllers 100, and other processor based systems 30. Each processor based system 20 and 30 may be composed of one or more central processing units (CPU) 30, dynamic random access memory (DRAM) 40, memory controller 50 and a host channel adapter (HCA) 60. A switching fabric 70 may be used to interconnect serial ports to achieve transfer rates of more than one gigabit-per-second.

Referring to FIG. 1, the NGIO 10 channel architecture defines interfaces that move data between two "memory" regions or nodes. Access to any I/O unit, such as I/O controller 110 and network controller 100, may be accomplished by send or receive operations, as well as, remote direct memory access (RDMA) read and RDMA write operations. Cluster or channel adapters provide the control and logic that allows nodes to communicate to each other over NGIO 10. There are two types of channel or cluster adapters. The first may be a host channel adapter (HCA) 60 and second may be a target channel adapter (TCA) 90. A processor based system 20 or 30 may have one or more HCAs 60 connected to it. Further, a network controller 100, and an I/O controller 110 may have one or more target channel adapters (TCA) 90 connected to it. Communications in a NGIO 10 architecture may be accomplished through these cluster adapters (HCA 60 or TCA 90) directly or through switches 80.

As can be seen in FIG. 1, the NGIO 10 architecture enables redundant communications links between HCAs 60, switches 80 and TCAs 90. Further, it may be possible to create a routing and distance table to identify the shortest paths between nodes in the network. In this case, distance is defined as being the shortest time between to points and not the physical distance. A node or cluster adapter may be either a HCA 60 or a TCA 90. Therefore, when data is sent to a memory location in a node it will take the shortest path available and arrive as fast as possible. However, if a failure occurs to a switch 80 then an alternate path may have to be configured and the distance table would have to be computed again.

Figure 2:
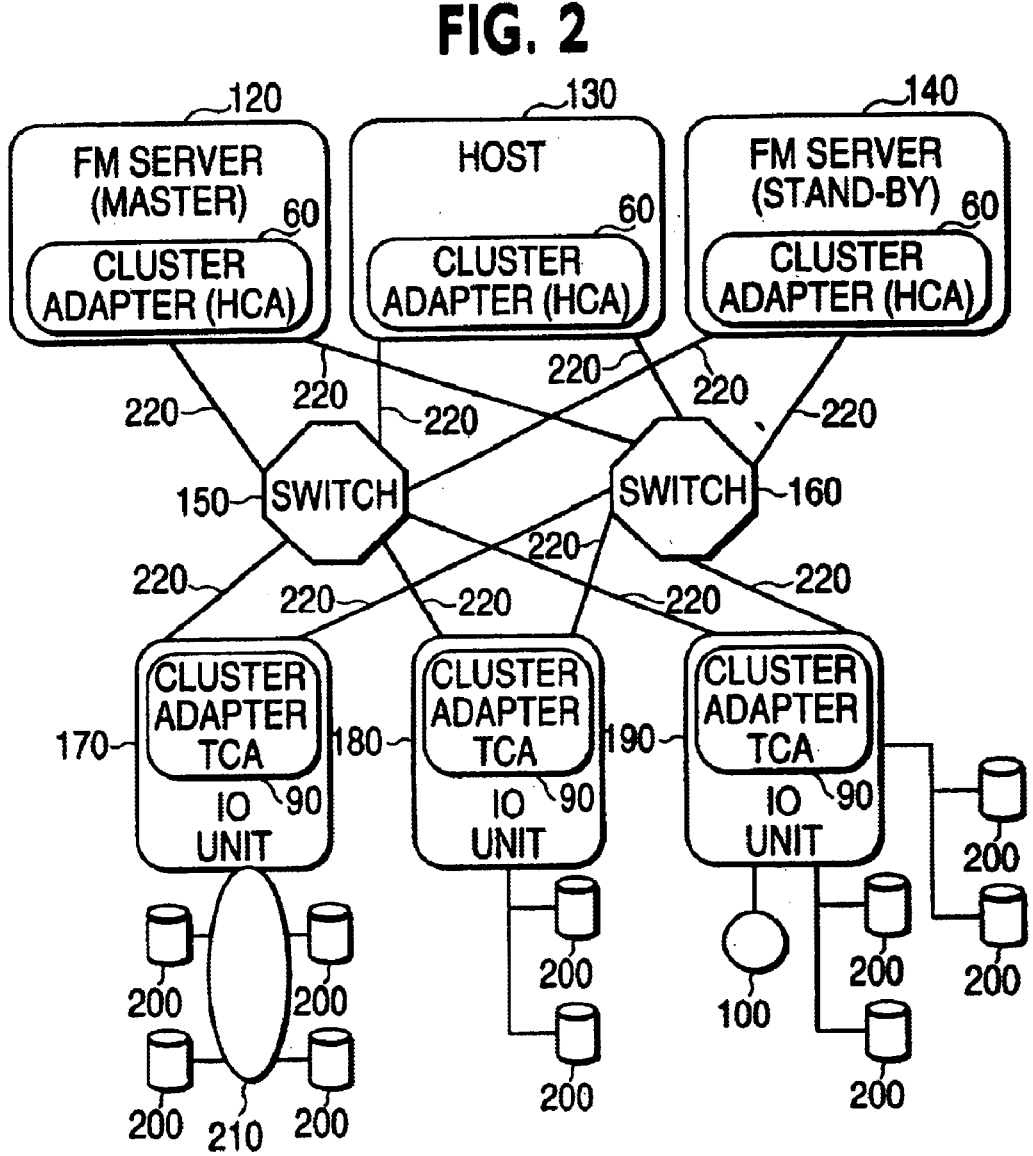
FIG. 2 is an example of a NGIO system diagram used in the example embodiments of the present invention.

FIG. 2 is another example of a NGIO 10 system architecture which may be used in the example embodiments of the present invention. In the NGIO 10 system architecture diagram shown in FIG. 2 all links 220 between master fabric manager (FM) server 120, host 130, standby FM server 140, switch 150, switch 160 and input/output (I/O) units 170, 180 and 190 are active as indicated by solid lines. A link 220 may be a bidirectional communication path between two connection points within the cluster a NGIO 10 architecture. A cluster adapter, which refers to both a HCA 60 and a TCA 90, performs operations by exchanging packets of information with another cluster adapter. A server such has FM server 120, host 130 and FM server 140, may have one or more host channel adapters (HCA) 60 and an input/output (I/O) unit, such as I/O unit 170, I/O unit 180 and I/O unit 190, may have one or more target channel adapters (TCA) 90. Each I/O unit, 170, 180 and 190, may support any number and type of peripheral and communications devices. For example I/O unit 170 has several disk drives 200 connected in a ring structure 210, while I/O units 180 and 190 also support numerous disk drives 200 on buses. Further, I/O unit 190 also supports a connection to a network controller 100 used to communicate to a LAN or WAN. Switches 150 and 160 are multi-port devices that forward or pass cells or packets of data between the ports of switch 150 and switch 160. Each switch 150 or 160 element contains within it a routing and distance table 900, shown in FIGS. 10 and 11, used to direct a packet of data to a node via the shortest path possible, as discussed in further detail ahead. A cluster adapter (HCA 60 or TCA 90) performs its operations by exchanging packets of information with another cluster adapter using links 220.

Still referring to FIG. 2, each component or node, in this example NGIO 10 architecture, such as master FM server 120, Host 130, standby server 140, switch 150 and 160, and I/O units 170, 180 and 190 are given a global unique identifier (GUID). This GUID uniquely enables each component to self-identify itself and may be 128 bits in length.

One of the benefits of employing an NGIO 10 architecture as shown example embodiment shown in FIG. 2 is that even when a complete failure occurs in either switch 150 or switch. 160 communications may be still possible through the remaining working switch 150 or 160. However, loss of a link 220 would require the routing and distance tables in each switch 150 and switch 160 to be at least in part reconfigured using the embodiments of the present invention.

Figure 3:
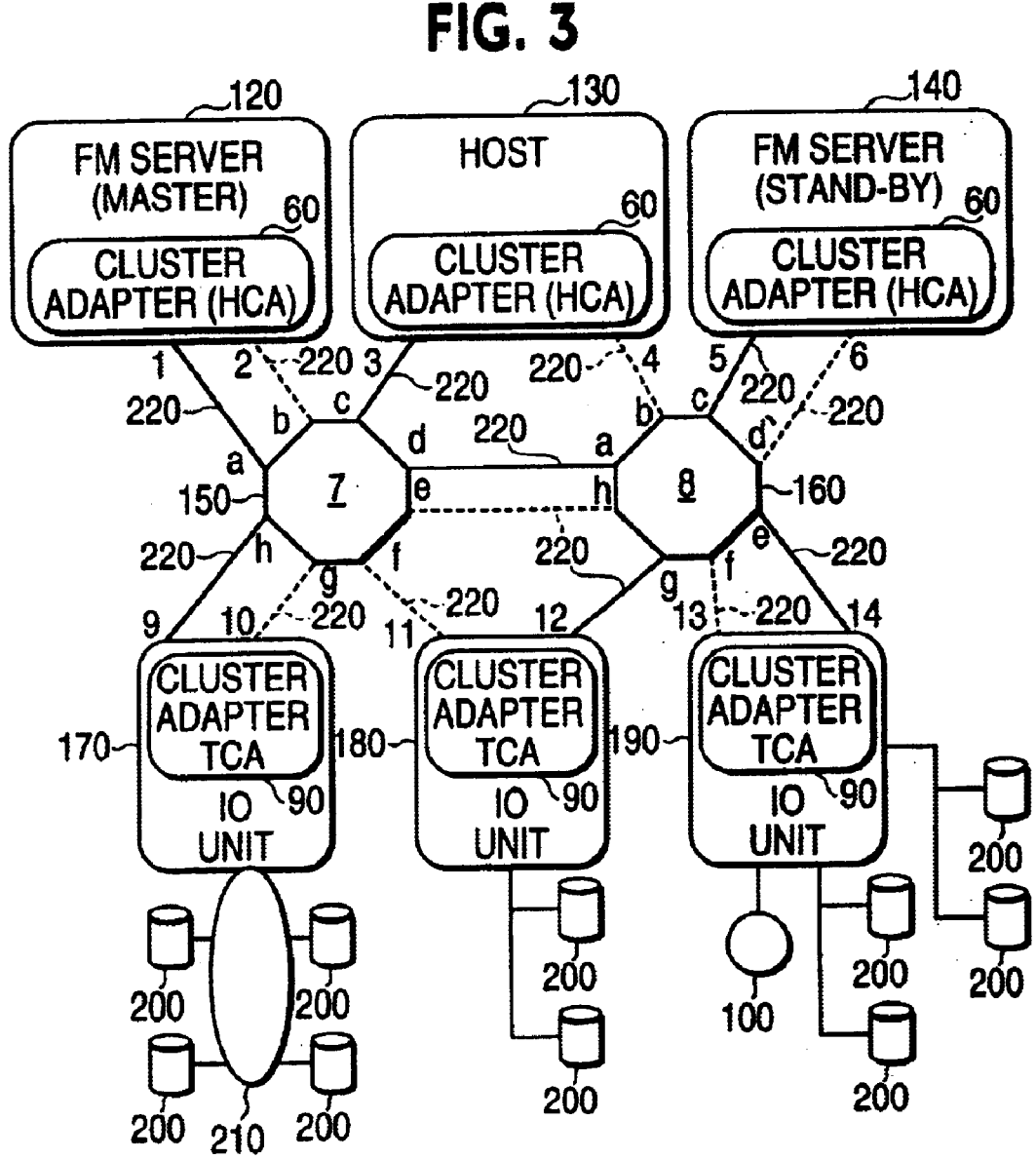
FIG. 3 is still another an example of a NGIO system used in the example embodiments of the present invention.

FIG. 3 is another example of a NGIO 10 architecture that may be used by the embodiments of the present invention. This example NGIO 10 architecture is identical to that shown in FIG. 2 and the discussion provided for FIG. 2 also applies to FIG. 3 with three notable exceptions. First, links 220 appears as either solid lines or dashed lines. When a link 220 is represented as a solid line, this indicates that it may be an active link which will be used for communications. When link 220 is represented by a dashed line, this indicates that the link may be in a standby mode and may be used for communications should the active link 220 fail, otherwise, the dashed line link 220 is not used for communications. The second notable difference is that a link 220 exists between switch 150 and switch 160. This enables data packets to be transmitted and received to and from switch 150 and switch 160. The third difference is that each port on each node including master FM server 120, Host 130, standby server 140, I/O units 170, 180, and 190 are labeled 1–6 and 9–14. Further, switch 150 is labeled 7 and switch 160 is labeled 8. These labels, 1–14, are Manager Address Cluster Identifications (MacId). Each port of a cluster adapter (HCA 60 and TCA 90) and all ports of a switch element (switch 150 and switch 160) are assigned a distinct MacId value by the master FM server 120 as will be discussed in further detail ahead. This cluster-wide unique MacId value may be used for routing decisions at each cluster component. In the example NGIO 10 architecture shown FIG. 3 the ports on each switch, 150 and 160, are labeled a through h. Thus, the MacId for the switch 150 would be labeled 7 for ports a through h and for switch 160 would be labeled 8 for ports a through h.

Further regarding FIG. 3 as discussed above, all links 220 and their associated ports with their port states exist in one of two conditions or states. The port state may either in a standby or CONFIG state indicating that the link 220 is not currently being used or they are in an active state and being used. Prior to cluster components or nodes, such as master FM server 120, Host 130, stand-by server 140, switch 150 and 160, and I/O units 170, 180 and 190, communicating with each other, it is necessary that a fabric manager (FM) module 260, shown in FIG. 9, configure a unique MacId for each cluster adapter port and a switch element. The FM module 260 must also load the routing and distance table 900, shown in FIG. 11, for each switch element, 150 and 160. The FM module 260 will be discussed in further detail in reference to FIGS. 7 through 9 ahead.

The benefit provided by the NGIO 10 architecture, shown in FIG. 3, is that a failure in a single link 220 would only require a minor modification in the routing and distance table associated with the switch 150 or 160 as will be discussed in further detail ahead.

At this point in the discussion of the example embodiments of the present invention, the NGIO 10 architectures shown in FIGS. 1 through 3 are merely examples of the types of NGIO 10 architectures possible. Any number of variations in the configurations of nodes and switches is possible as will become evident in the discussion provided with reference to FIG. 5. The various configurations discussed in reference to the example embodiments should not be interpreted as narrowing the scope of the invention as provided in the claims.

Figure 4:
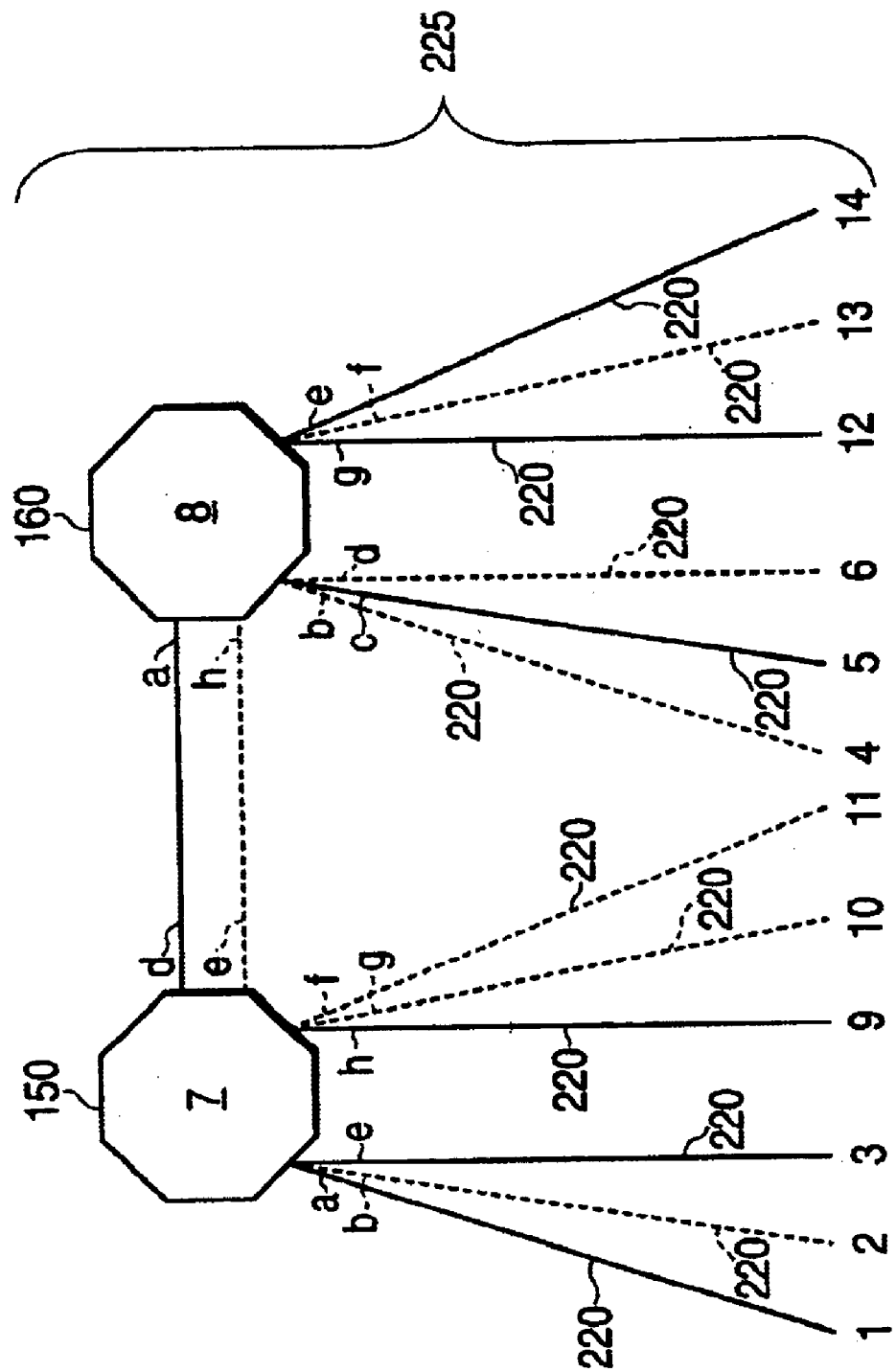
FIG. 4 is an example of a spanning tree derived from FIG. 3 and used in illustrate the embodiments of the present invention.

FIG. 4 is an example spanning tree (ST) 225 based on the NGIO 10 architecture shown in FIG. 3 generated using the example embodiments of the present invention as discussed in reference to FIGS. 6 through 9 of the present invention. It should be noted that since only two switches, 150 and 160, are shown in FIG. 3 then only two switches, 150 and 160, are shown at the apex of the spanning tree (ST) 225. All MacIds for each port of the cluster adapters (HCA 60 and TCA 90) are shown as well as the MacIds for the switches 150 and 160. As with FIG. 3, FIG. 4 shows all links 220 as either active by solid lines or in a standby or CONFIG mode as indicated by dashed lines. Using such a ST 225, routing of data packets is deadlock free since no cycles or loops exist in any of the active links. The creation of the ST 225 will be discussed in further detail in the example embodiments discussed in reference to FIGS. 6 through 9 ahead.

Figure 5:
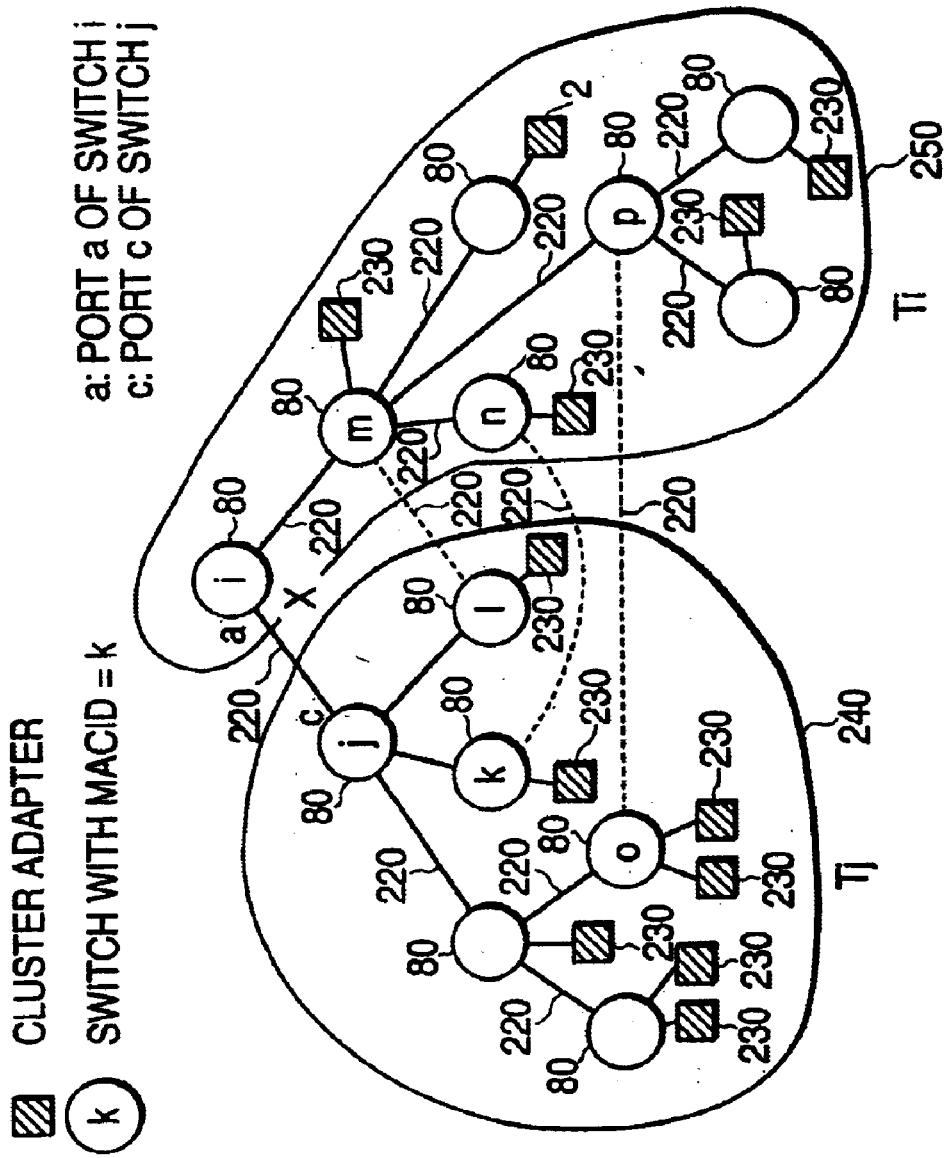
FIG. 5 is a diagram showing an example link failure in a NGIO system and alternate connection links as dashed lines that may be used.

FIG. 5 is another example of a network configuration possible under using NGIO 10 architecture. In FIG. 5, several switches 80, identical to those shown in FIG. 1 and similar to switches 150 and 160 shown in FIGS. 2 through 4 are shown. Each switch 80 may be connected to another switch 80 or nodes 230. As discussed earlier a node 230 may be any cluster adapter such as HCA 60 and TCA 90 shown in FIGS. 1 through 3. However FIG. 5 is used to illustrate the system, method and computer program used in the present invention to identify and repair a communication failure between switches 80 labeled i and j when link 220 between ports labeled c and a fails. As discussed above each switch 80 has a routing and distance table 900 contained within it. As will become evident by the discussion provided in reference to FIGS. 6 through 9, that the embodiments of the present invention are able to discover the link 220 failure, identify a substitute link 220 that has the least impact on the NGIO 10 architecture and the spanning tree 225, exemplified in FIG. 4, and update the routing and distance tables 900 shown in FIGS. 10 through 12. As will be discussed in further detail ahead, the network configuration shown in FIG. 5 will have to be partitioned into two segments called tree Tj 240 and tree Ti 250, respectively referred to as a first tree and a second tree.

Figure 6:
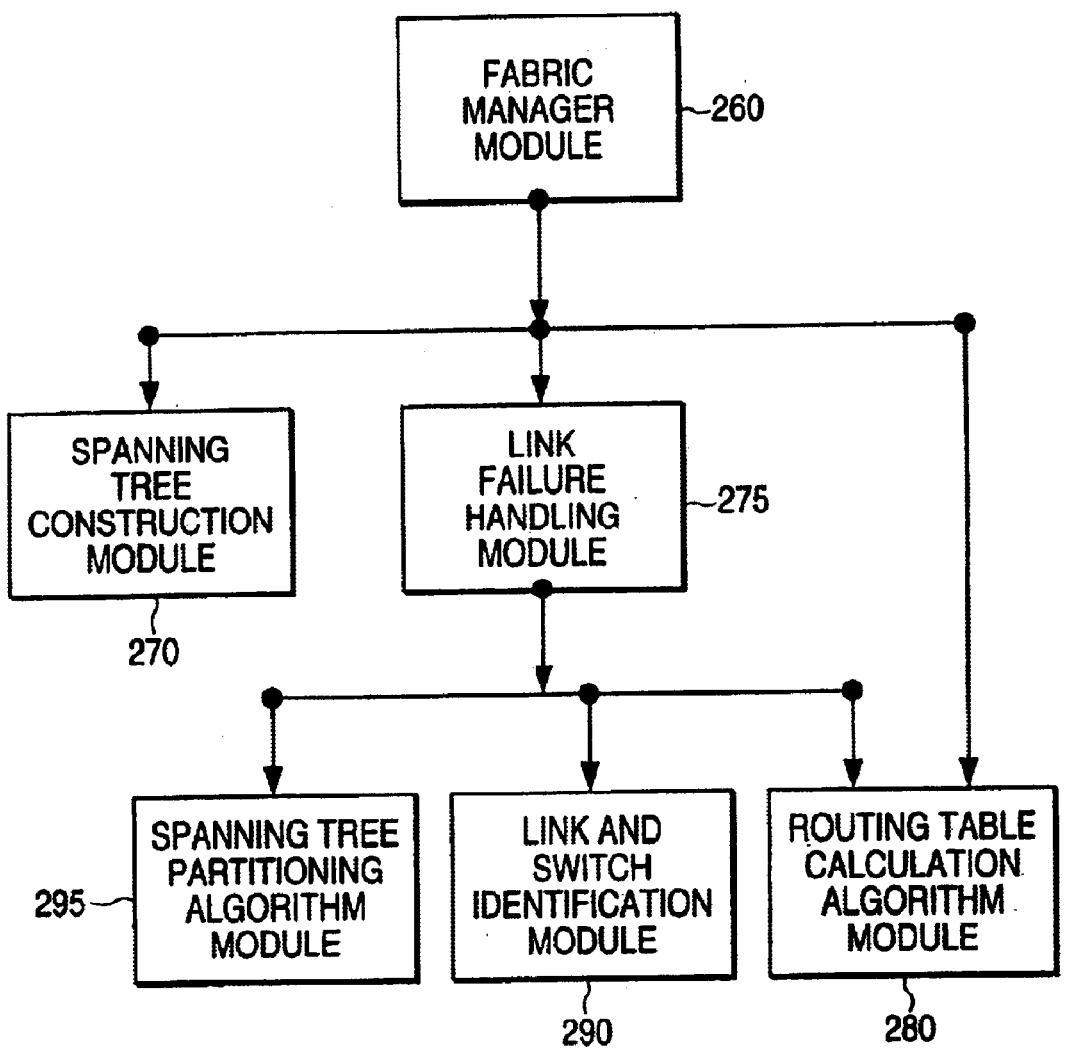
FIG. 6 is a modular configuration diagram of the example embodiments of the present invention shown in FIGS. 7 through 9.
Figure 7:
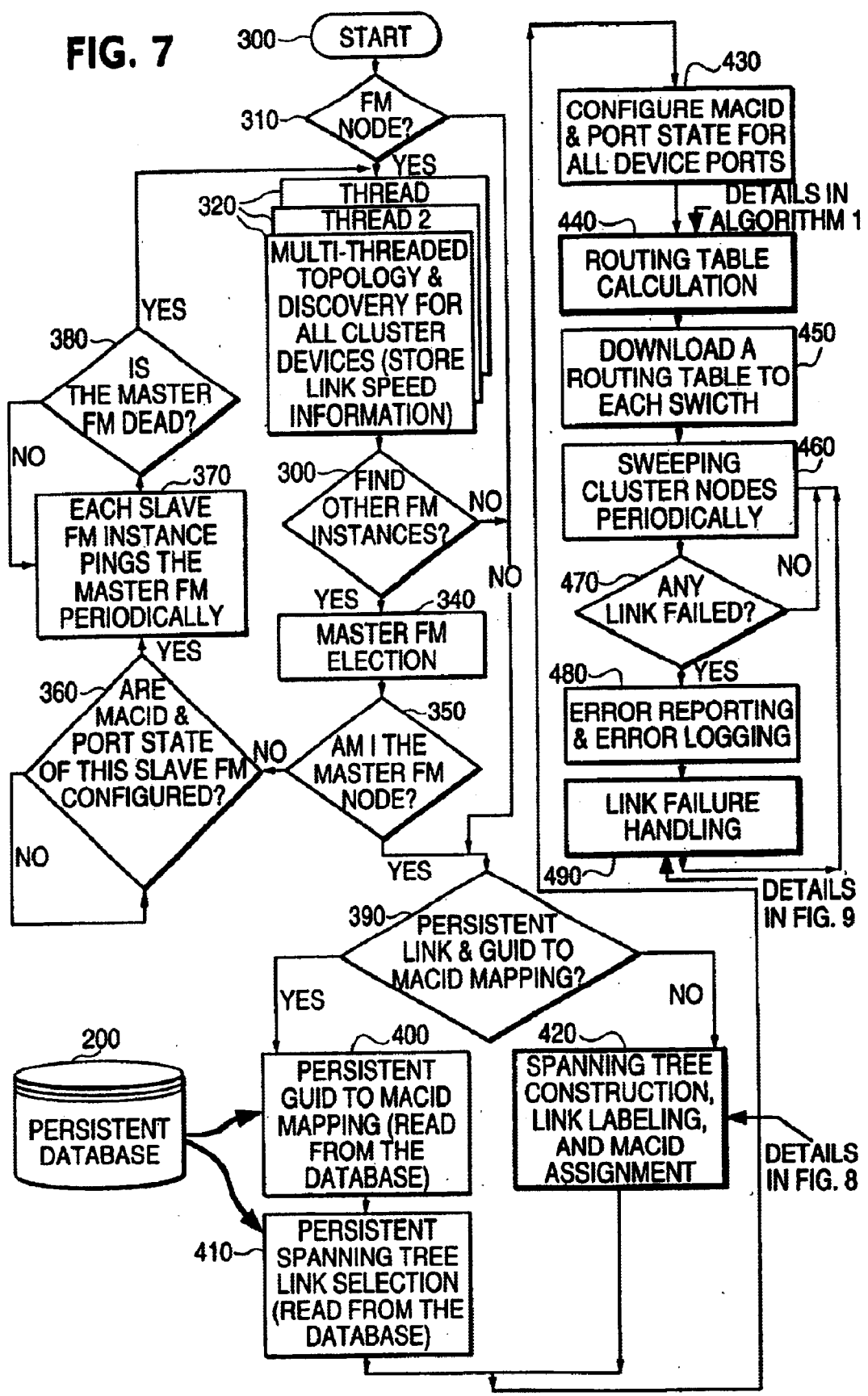
FIG. 7 is an overall example flowchart of example operations performed by an example embodiment of the present invention.
Figure 8:
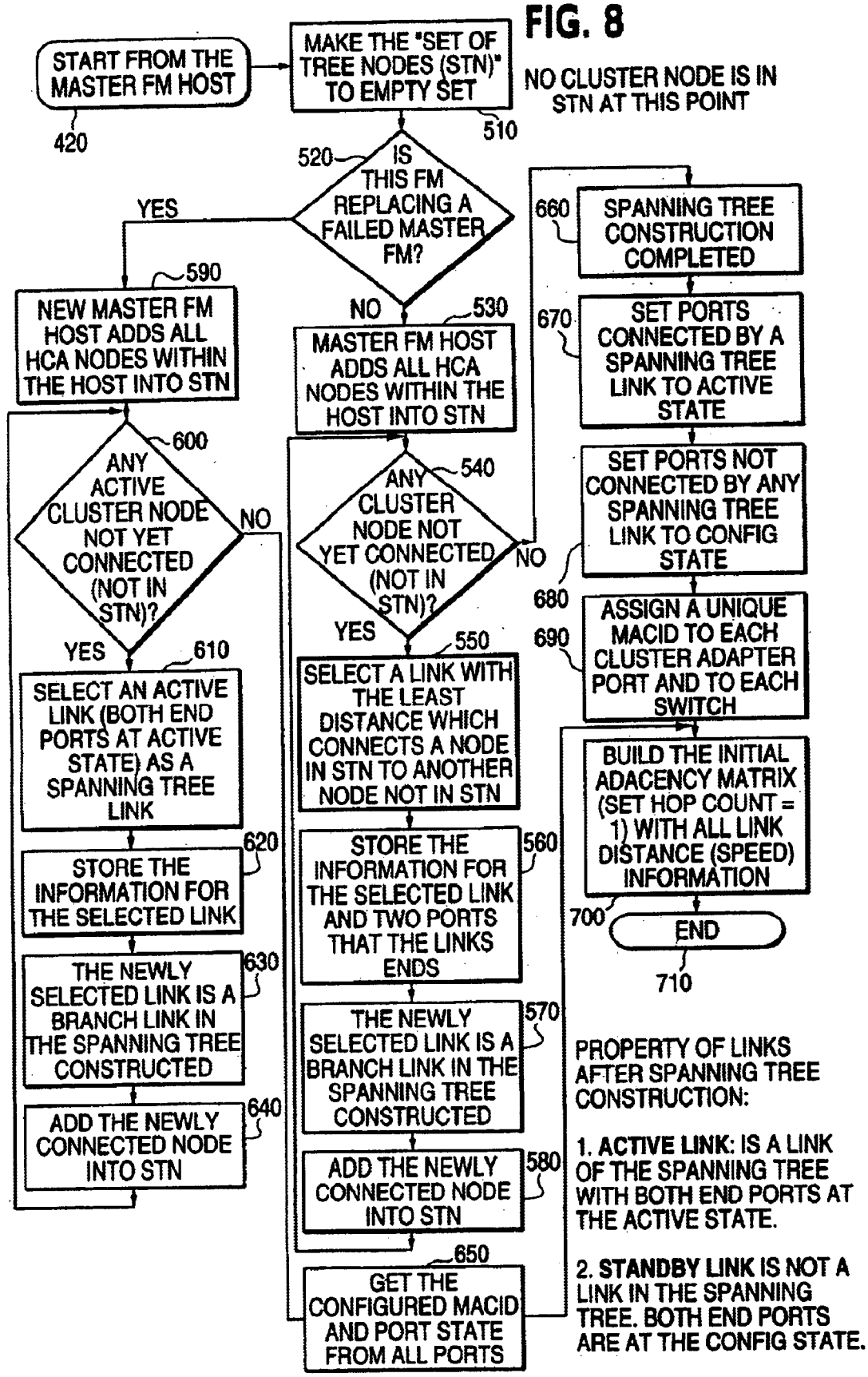
FIG. 8 is an example flowchart of example operations performed in order to construct a spanning tree, as exemplified by FIG. 4, in the example embodiments of the present invention.
Figure 9:
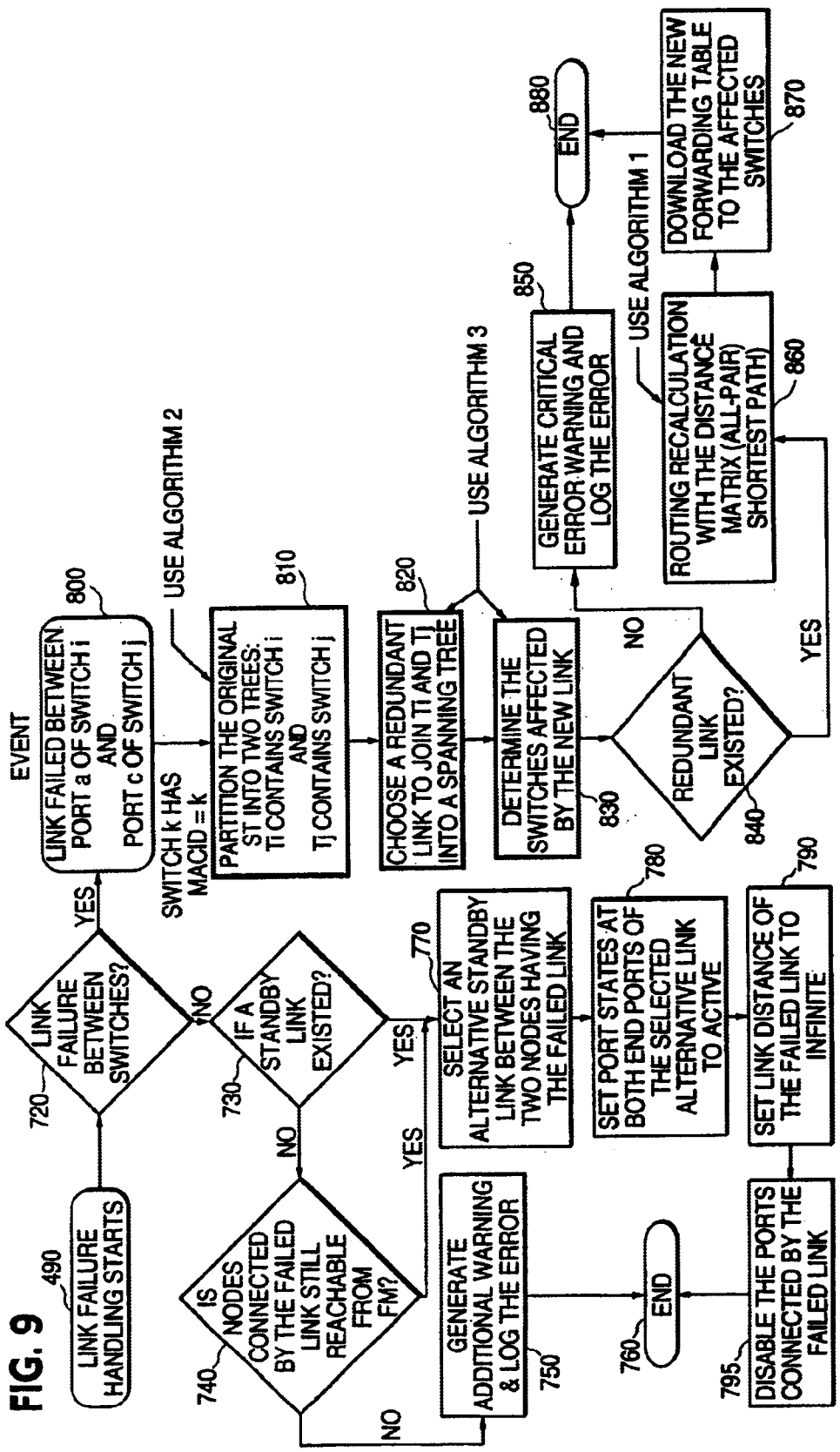
FIG. 9 is an example flowchart of example operations performed to recover from a link failure, as exemplified by FIG. 5, in an example embodiment of the present invention.

FIG. 6 is a modular diagram of the software, commands, firmware, hardware, instructions, computer programs, subroutines, code and code segments discussed in reference to the example flowcharts discussed ahead in reference to FIGS. 7 through 9. The modules shown in FIG. 6 may take any form of logic executable by a processor, including, but not limited to, programming languages, such as C++. FIG. 6 shows a fabric manager (FM) module 260 that includes operations 300 through 490, shown in FIG. 7. As can be seen in FIG. 6, the FM module 260 calls upon the spanning tree (ST) construction module 270, link failure handing module 275, and routing table calculation algorithm module 280. ST construction module 270 includes operations 420 through 650 shown in FIG. 8. Link failure handing module 275 includes operations 720 through 870 shown in FIG. 9. Routing table calculation algorithm module 280 is discussed in reference to an example C++ code segment provided ahead. Further, the link failure handing module 275 calls upon a spanning tree (ST) partitioning algorithm 295 and a link and switch identification module 290 as well as the routing table calculation algorithm module 280 to perform its function of detecting link failures and taking corrective action. The ST partitioning algorithm 295 and a link and switch identification module 290 are discussed in reference to an example C++ code segment provided ahead.

In the discussion FIGS. 6 through 9, where appropriate, reference will also be made to FIGS. 10 through 12 which illustrate examples of routing and distance tables 900 which indicate the shortest path between any two nodes in a network. In this case distance would mean the shortest travel time between two nodes. A portion of the routing and distance table 900 may be stored in each switch 80 shown in FIG. 1 and FIG. 5 as well in the example network configurations having switches 150 and 160 shown in FIGS. 2 through 4. FIG. 10 shows the initial construction of the routing and distance table 900. FIG. 11 shows the final form of the routing and distance table 900. FIG. 12 shows the changes needed in two rows 1000 of the routing and distance table 900 after a link 220 failure has been detected and corrected.

Referring to FIG. 7, the FM module 260 begins execution in operation 300. Then in operation 310, it is determined if the node being examined is a FM node such as master FM server 120 or standby FM server 140 shown in FIG. 2 and FIG. 3. If the node is determined in operation 310 to be a FM node then processing proceeds to operation 320 where a multithreaded topology and component discovery occurs. If it is not determined to be a FM node then processing proceeds to operation 390. In operation 320 the cluster or network component discovery may be performed with multiple threads running at the master FM server 120. Any standard tree traversal algorithm may be used to traverse the cluster topology. Such algorithms include, but are not limited to, breadth-first and depth-first tree search for the master FM server 120 instance. Each new node found in the NGIO 10 architecture may be distinguished by the unique GUID value discussed earlier. Topology components are added into the ST 225 tree by multiple concurrent threads at this master FM server 120 or standby FM server 140. Any conflict may be resolved using any basic locking operation, such as, but not limited to a semaphore.

Still referring FIG. 7, in operation 330 a determination may be made as to whether any other FM nodes or instances exist. If no other FM nodes exist then processing proceeds to operation 390. However, as in the case shown in FIG. 2 and FIG. 3, there exists another FM node and processing thus proceeds to operation 340. In operation 340, one of the FM nodes may be selected as a master FM server 120 as provided in FIG. 2 and FIG. 3. The selection of the master FM node may be done by the systems administrator, random selection or any other algorithm to select to most efficient FM node as the master FM node 120. This selection process may also be done by the FMs negotiating for the role of the master FM server 120 based first on priority, then on GUID value. In the case of a priority tie, the lower GUID value of the two FMs shall always be the master FM server 120. Then in operation 350, a determination may be made whether the FM node executing the FM module 260 is the master FM node 120. If the current FM node is not the master FM server 120 then processing proceeds to operation 360 where the standby FM server 140 enters a loop awaiting the assignment of a MacId to its ports and the indication of which ports are active and which are inactive. Once the master FM server 120 assigns the MacId values and indicates active ports in operations 430, discussed ahead, processing proceeds to operation 370 for the standby FM server 140 where it "pings" the master FM server 120 to determine if it is alive and operating. This "ping" entails the sending of a message to the master FM server 120 and the awaiting of a response. If a response is received, then in operation 380 it may be determined that the master FM is operating properly and processing proceeds to return to operation 370 where after a predetermined time another "ping" may be issued. This continues as long as the master FM server 120 provides a response. However, if no response is received in a predetermined time period then it may be assumed that the master FM server 120 is unable to communicate to the NGIO 10 architecture and processing proceeds back to operation 320 in order to set up the topology of the network again.

Still referring to FIG. 7, assuming the master FM node 120 is the node executing the FM module 260, then processing proceeds to operation 390. In operation 390, it determined whether a predetermined persistent or constant spanning tree (ST) 225 and GUID-MacId mapping is desired. If such a constant or persistent ST 225 is desired, then processing proceeds to operation 400 where a persistent database on a disk 200 may be accessed. A persistent file containing the constant or persistent information may be examined before labeling the active links 220 in the ST 225. In operation 400, the GUID may be first mapped to the MacId as read from the persistent database on disk 200. Then in operation 410, the spanning tree 225 may also read from the persistent database on disk 200. Using this persistent or constant database on disk 200, a systems administrator may fix the configuration of the NGIO 10 architecture to whatever desired. However, this fixed or constant approach may not necessarily be the preferred approach.

Therefore, still referring to FIG. 7, the spanning tree (ST) construction module 70, shown in FIG. 8, may be executed to create the GUID to MacId mapping and generate the ST 225. The spanning tree (ST) construction module 270 is discussed in further detail in reference to FIG. 8 ahead. Once the ST 225 is completed by either operation 410 or operation 420, the routing and distance table 900 appears as it does in FIG. 10 and the ST 225 appears as it does in FIG. 4. The creation of the ST 225 and initial routing and distance table will be discussed further in reference to FIG. 8. Processing then proceeds to operation 430 where each MacId may be identified as active or standby for each port of each cluster adapter 80. Thereafter, in operation 440 the routing and distance table 900, as shown in FIG. 11, may be calculated. This routing and distance table 900 calculation may be performed by the routing table calculation algorithm module 280 shown in FIG. 6 and discussed ahead. This routing table calculation algorithm module 280 is designed to determine the shortest distance between each active port of each cluster adapter 80 and may be implemented using the code segment illustrated ahead in algorithm 1—routing table calculation module 280. However, the code segment provided for routing table calculation algorithm module 280 ahead is only supplied as an example of the type of code that may be used and it is not intended to limit the routing table calculation algorithm module 280 to this specific code. Any sort of algorithm, code, or computer language which will determine the shortest path between nodes or cluster adapter 80 active ports may be used.

Algorithm 1 - Routing Table Calculation Module 280

```
// Matrix IDM: initial distance/adjacency matrix
// Matrix DM: final distance/adjacency matrix
//
// DM[i,k];      contains routing information from MacId i to MacId k
all_pair_shortest_distance(IN Matrix IDM, OUT Matrix DM)
{
    int    i, j, k;
    DM = IDM;                        // copy matrix content
    for (k = 1; k <= n; k = k+1) {
        for (i = 1; j <= n; i = i+1) {
            for (j = 1; j <= n; j = j+1) {
                if (DM[i,j].distance > DM[i, k].distance + DM[k, j].distance) {
                        DM[i, j].distance = DM[i, k].distance + DM[k, j].distance;
                DM[i, j].hopCount = DM[i, k].hopCount + DM[k, j].hopCount;
                DM[i, j].outport = DM[i, k].outport;
                }
            }
        }
    }
}
```

Once routing and distance table 900 is completed, as shown in FIG. 11, processing proceeds to operation 450 where the routing and distance table 900 may be downloaded to each switch 80 in the NGIO 10 architecture. Thereafter, in operation 460, the master FM server 120 "sweeps" the NGIO 10 architecture to determine if all links 220 and cluster adapters (HCA 60 and TCA 90) are active.

This entails sending a message to each device port via active links 220 and awaiting a response. If a response is received from all active links, it may be determined in operation 470 that all links are active and communicating. This causes an indefinite loop to repeat in which the NGIO 10 architecture may be periodically "swept." However, if a link 220 does not respond, in operation 470, then in operation 480 a link 220 failure may be reported and logged and processing proceeds to operation 490. In operation 490, the link failure handling module 275, shown in FIGS. 6 and 9 may be executed.

FIG. 8 illustrates the operations contained in the spanning tree construction module 270 which includes operation 510 through 710. Operation 420 shown in FIG. 7, causes the start of the spanning tree construction module 270 in FIG. 8. Execution begins in operation 510 by setting the ST 225 to the null state. In this way the entire ST 225 will be built. Then in operation 520, it may be determined whether the standby fabric manager (FM) server 140 is replacing a failed master FM server 120. If the standby fabric manager (FM) server 140 is replacing a failed master FM server 120 then processing proceeds to operation 590. If it is not, then processing proceeds to operation 530. In operation 530, the master FM server 120 adds all the HCA 60 ports it has to the ST 225 first. Then in operation 540, it may be determined whether any other node or cluster adapter (HCA 60 or TCA 90) remains to be added to the ST 225. If there is no other cluster adapter to be added to the ST 225 then processing proceeds to operation 660. However, if further cluster adapters need to be added to ST 225, then processing proceeds to operation 550. In operation 550, the link 220 having the shortest distance, in terms of travel time, to the next node or cluster adapter may be selected. Then in operation 560, this selected link 220 and the two associated points are stored and in operation 570 in which this link forms another branch in the ST 225 which may be added to the ST 225 in operation 580. Thereafter, the operation branches back to operation 540 and may be repeated until no ports on cluster adapters (HCA 60 and TCA 90) remain unassigned at which point processing branches to operation 660.

Still referring to FIG. 8, in operation 660 the ST 225 is completed as shown in FIG. 4 and in operation 670 the ports of each cluster adapter (HCA 60 and TCA 90) are set to an active state. All ports not in the ST 225 are set to CONFIG or standby mode in operation 680. Thereafter, in operation 690 unique MacId values are assigned to each port of each cluster adapter and switch 80 in the NGIO 10 architecture. Then in operation 700 the initial values of the routing and distance table 900 are set.

The setting of the initial values for the distance or routing table 900 may be accomplished by using the designation of distance (port) (d(p)) in each row 1000 and column 1100 of the distance or routing table 900. As indicated in FIG. 10, each entry may be represented by distance (d), and the out going port number (p), respectively. The distance (d) value may be used to represent link speed information. The smaller value d, the faster link speed. The shaded or hatched entries represent redundant paths. Thus, there are multiple entries for each switch 150 and 160 has eight ports and thus eight entries in each row 1000 labeled 7 and 8. The distance (d) between any two switch ports may be treated as zero. The designation "In" in FIG. 10 indicates that communications may be occurring within a node or cluster adapter and a component software stack (not shown) should handle the communication within the same component. An empty value in the distance or routing table 900 indicates that there may be no path or route between any two points initially set. The shortest path algorithm used to create the values in the distance or routing table 900 uses the formula Minimum {D(i, k)}, D(i, k)=D(i, j)+D(1, k), for i, j, k=1, . . . , 14 and i, j, k to determine if a shorter path exists where D(i, k) denotes the current known distance from MacId i to MacId k.

Once operation 700 completes in FIG. 8, then processing of the spanning tree construction module 270 terminates in operation 710. However, in the event that operation 520 determines that the master FM server 120 has failed then processing proceeds to operation 590. In operation 590 the standby FM server 140 adds all HCA 90 ports connected to the standby FM server 140 to the ST 225. Then in operation 600, it may be determined if any additional cluster adapter (HCA 60 and TCA 90) ports need to be added to the ST 225. If none remain to be added then processing proceeds to operation 650 where the MacId and port states are retrieved from all ports and processing proceeds to operation 700 as previously discussed. However, it may be determined in operation 600 that further adapter cluster ports need to be added to the ST 225, and processing proceeds to operation 610 in which active links are added to the ST 225. Then, in operation 620, these active links are stored and added as a branch to ST 225 in operation 630 and operation 640. This process then repeats until no further active cluster adapter ports need to be added to the ST 225.

FIG. 9 details the operation of the link failure handling module 275 shown in FIG. 6 and includes operations 720 through 870 shown in FIG. 9. The link failure handling module 275 may be initiated by operation 490 shown in FIG. 7 and FIG. 9. In operation 720, it may be determined if the link failure has occurred between two switches 80 by the master FM server 120 "pinging" a switch 80 through another switch 80 as discussed above. If no response is received then it may be assumed that the switch 80 or link 220 between the switches 80 is not operating and processing proceeds to operation 800. If a response is received then it may be assumed a link 220 is disabled and a determination is made in operation 730 if a standby link 220 exists. If no standby link 220 is available then processing proceeds to operation 740 where it may be determined whether the node or cluster adapter can be reached through some other route. Since in most cases only two links 220 are provided per cluster adapter and apparently both are not responsive then processing usually will proceed to operation 750 where an additional error may be reported and logged indicating that a cluster adapter and node are not reachable by the NGIO 10 architecture and processing terminates in operation 760. However, if another standby or alternate link is available then processing proceeds to operation 770 where the alternate or standby link 220 may be selected. In operation 780, the ports at both ends of the link are set to active and the distance for the failed link may be set to infinite in the effected row of routing and distance table 900 shown in FIG. 11. Thereafter, the ports connected to the failed link 220 are disabled in operation 795 and processing terminates in operation 760.

Still referring to FIG. 9, if in operation 720 it is determined that a link between switches 80 has failed then processing proceeds to operation 800. In operation 800 it may be determined that communications through link 220 connecting switch 80 labeled j and switch 80 labeled i, shown in FIG. 5, may be disabled. Processing then proceeds to operation 810 where a spanning tree partitioning algorithm module 295 may be executed as indicated ahead. However, it should be noted that the code segment provided for the spanning tree partitioning algorithm module 295 ahead is only supplied as an example of the type of code that may be used and it is not intended to limit the spanning tree partitioning algorithm module 295 to this specific code. Any sort of algorithm, code, or computer language which will partition a computer network into two or more segments, called tree Tj 240 and tree Ti 250 in FIG. 5, may be used.

---
Algorithm 2 - Spanning Tree Partitioning Algorithm Module 295
---

```
// look at row i (MacId = i, i.e., switch i)
// of the distance matrix DM
// n = number MacIds
Ti = empty set;
Tj = empty set;
for (m = 1; m <= n; m = m+i) {
    // DM[i, m].outport is the outgoing
    // port to reach MacId m
    // from switch i
    if (DM [i, m].outport == port a) {
        add k into Tj;
    } else {
        add k into Ti;
    }
}
```

In operation 810, the spanning tree partitioning algorithm module 295 partitions the NGIO 10 architecture into two trees at the point of link 220 failure between switch 80 labeled j and switch 80 labeled i in FIG. 5. Grouping of the partitions can be easily determined by the outgoing port of switch i or j. For this example, any MacId having connection with switch 80 labeled j may be identified as being in tree Tj 240 and any MacId having connection with switch 80 labeled i may be identified as being part of tree Ti 250. Once the NGIO 10 architecture is divided into two separate trees processing proceeds to operation 820 where all other possible links 220 between the two trees are identified and the one which has the least impact on the routing and distance table shown in FIG. 11 may be selected. In the example provided in FIG. 5, three possible links also exist between tree Tj 240 and tree Ti 250. These links include link 220 between switch 80 labeled l and switch 80 labeled m, link 220 between switch 80 labeled k and switch 80 labeled n, and link 220 between switch 80 labeled O and switch 80 labeled p. This selection process may be accomplished by algorithm 3—link and switch identification module 290 provided ahead. Thereafter, once the new link is selected in operation 820 all switches 80 affected by the creation of the new link 220. In the example provided in FIG. 5, the link and switch identification module 290 would select link 220 between switch 80 labeled l and switch 80 labeled m as having the least impact and switches 80 labeled i, j, l and m as needing their routing and distance tables 900 as being updated. As noted earlier, any of numerous possible code segments in many different programming languages other than C++ may be used to create the link and switch identification module 290 provided ahead as merely an example of one.

---
Algorithm 3 - Link and Switch Identification Module 290
---

```
// n = number of MacIds in the cluster
error = 0;                          // error = 0 if no error
// sum of minimum hop count h( i, m ) + h( j, l )
min_sumHC = 2n + 2;
new_i = 0;                          // 0 is not a valid number
```

---
-continued
Algorithm 3 - Link and Switch Identification Module 290
---

```
new_j = 0;
for(m=1; m in Ti && m <= n; m = m+1) {
    if (m is not a switch node)
        delete m from Ti;
}
delete i form Ti;                   // switch i link failue
sort (in ascending order) the element within Ti by the h(i, m) value;
// now elements within Ti are in ascending h(i, m) order
for (m = 1; m <= number of element in Ti ; m = m+1) {
    if (h(i, m) >= min_sumHC)
        break;                      // DONE
    // look at the initial adjacency matrix.
    // Does the switch m have a redundant link from Ti to Tj ?
    if (switch m is NOT connected to Tj)
        continue;                   // not a choice
    links = number of redundant links of switch m connecting Ti to Tj;
    hopCount_from_j = n + 1;
    for(k = 1; k <= links; k = k+1) {
        // hop count in Tj tree using the final distance matrix
        l = MacId of the peer switch (connected by link k);
        if (hopCount_from_j > h(j, l)) {
            hopCount_from_j = h(j, l);
            new_j = 1;              // possible end of the new linkin Tj
            if (min_sumHC > h(i, m) + hopCount_from_j) {
                min_sumHC = h(i, m) + hopCount_from_j;
                new_i = m;          // possible end of the new link in Ti
            }
        }
    }           // for (k = 1; ...
}               // for (m = 1; ...
if (new_i == 0 || new_j == 0) {
    // no redundant link available
    error = 1;
    general critical error warning and log the error information;
    exit link failure handling routine;
}
// determine the switches affected by the new link
S = empty set; // set of switches affected
// look at the final distance matrix
Add switches nodes in Ti from i to new_i to S ;
Add switches nodes in Tj from j to new_j to S ;
```

Once the link and switch identification module 290 completes execution, a determination may be made whether any links 220 were found in operation 840. If no other links were discovered by the link and switch identification module 290 then processing proceeds to operation 850 where a critical error message may be reported and logged. Thereafter, processing terminates in operation 880.

Still referring to FIG. 9, if an alternate link is identified by the link and switch identification module 290, then processing proceeds to operation 860 where algorithm 1—routing table calculation module 280 may be executed, as previously discussed, to generate the new rows 1000 and columns 1100 of the routing and distance table 900 shown in FIG. 12. Thereafter in operation 870 the routing and distance table 900 may be downloaded to all the affected switches and processing terminates in operation 880.

The benefit resulting from the present invention is that support for arbitrary topology in a network cluster is provided. The present invention is free from deadlocks due to the use of a spanning tree (ST) 225. Spanning tree (ST 225 reconstruction is possible at the point of link failure by using redundant links. There is very low overhead involved in the switch routing and distance table 900 update while handling a link 220 failure. The present invention also allows for both master FM severs 120 and standby FM servers 140 so that, if the master FM server 120 fails, the standby FM 140 may take over. Further, by using port states to label active links, the replacement a master FM server 120 uses the configured port state and MacIds which means that there is no impact on existing communication channels and routing and distance tables 900 in switches 80.

While we have shown and described only a few examples herein, it is understood that numerous changes and modifications as known to those skilled in the art could be made to the example embodiment of the present invention. Therefore, we do not wish to be limited to the details shown and described herein but intend to cover all such changes and modifications as are encompassed by the scope of the appended claims.

We claim:

1. A method of detecting and recovering from a communications failure in a network, comprising:

detecting a link failure of any link within a plurality of links connecting a plurality of nodes and a plurality of switches in a network;

partitioning the network into two trees at the point of the link failure;

identifying a link among the plurality of links that will establish communications between the two trees and will impact a minimum number of switches of the plurality of switches;

updating a routing and distance table having a shortest distance between each node of the plurality of nodes based on the link identified; and downloading the routing and distance table to the minimum number of switches impacted by the link identified.

2. The method recited in claim 1, wherein the plurality of nodes comprises a plurality of processor-based systems, a plurality of I/O units, and a plurality of network controllers.

3. The method recited in claim 2, wherein the each node in the plurality of nodes communicates to all other nodes through the plurality of links connected to the plurality of switches.

4. The method recited in claim 3, wherein one of the processor-based systems of the plurality of processor-based systems is selected to be a master fabric manager server and another of the processor-based systems is selected to be a standby fabric manager server.

5. The method recited in claim 4, wherein the master fabric manager server upon startup of the network configures the network by assigning a MacId value to a port of each node and identifying which of the ports are in an active mode and which are in a standby mode.

6. The method recited in claim 5, wherein the master fabric manager on a predetermined time basis sweeps the ports which are active to determine if the ports are still able to communicate.

7. The method recited in claim 6, wherein standby fabric manager server periodically pings the master fabric manager server to determine if it is operating and if a response is not received in a predetermined time period the standby fabric manager recalculates the routing and distance table and downloads the recalculated routing and distance table only to the switches that are impacted by the master fabric manger being offline.

8. The method recited in claim 7, wherein the partitioning of the network into two trees occurs only when the link failure is between two switches of the plurality of switches.

9. The method of recited in claim 8, wherein when the link failure is not between the two switches the master fabric manager server set a distance associated with the link failure in the routing and distance table to infinite and activates a standby link.

10. A system to detect and recover from a communications failure in a network, comprising:

a fabric manager module to manage and monitor a network having a plurality of nodes connected by a plurality of links through a plurality of switches, wherein the fabric manager module will detect a link failure in the plurality of links and further comprises:

a link failure handling module to partition the network into a first tree and a second tree at the link failure using a spanning tree partitioning algorithm module, identify links between the first tree and the second tree using a link and switch identification module, and calculate a routing and distance table using a routing table calculation algorithm module based on a link selected by the link and switch identification module.

11. The system recited in claim 10, wherein the fabric manager module further comprises:

a spanning tree construction module to build a spanning tree based on active links identified in the network upon initial startup of the network.

12. The system recited in claim 11, wherein the fabric manager module further comprises:

the routing table calculation algorithm module to calculate the shortest distance in the network between any two nodes of the plurality of nodes based on the spanning tree.

13. The system recited in claim 10, wherein the plurality of nodes comprises a plurality of processor-based systems, a plurality of I/O units, and a plurality of network controllers.

14. The system recited in claim 13, wherein the each node in the plurality of nodes communicates to all other nodes through the plurality of links connected to the plurality of switches.

15. The system recited in claim 14, wherein one of the processor-based systems of the plurality of processor-based systems is selected to be a master fabric manager server and another of the processor-based systems is selected to be a standby fabric manager server.

16. The system recited in claim 15, wherein the fabric manager module operates in master fabric manager server and upon startup of the network configures the network by assigning a MacId value to a port of each node and identifying which of the ports are in an active mode and which are in a standby mode.

17. The system recited in claim 16, wherein the fabric manager module on a predetermined time basis sweeps the ports which are active to determine if the ports are still able to communicate.

18. The system recited in claim 10, wherein the spanning tree partitioning algorithm module only partitions the network into the first tree and the second tree when the link failure is between two switches of the plurality of switches.

19. A computer program executable by a computer and embodied on a computer readable medium, comprising:

a fabric manager module code segment to mange and monitor a network having a plurality of nodes connected by a plurality of links through a plurality of switches, wherein the fabric manager module code segment will detect a link failure in the plurality of links and further comprises:

a link failure handling module code segment to partition the network into a first tree and a second tree at the link failure using a spanning tree partitioning algorithm module code segment, identify links between the first tree and the second tree using a link and switch identification module code segment, and calculate a routing and distance table using a routing table calculation algorithm module code segment based on a link selected by the link and switch identification module code segment.

20. The computer program recited in claim 19, wherein the fabric manager module code segment further comprises:
a spanning tree construction module code segment to build a spanning tree based on active links identified in the network upon initial startup of the network.

21. The computer program recited in claim 20, wherein the fabric manager module code segment further comprises:
the routing table calculation algorithm module code segment to calculate the shortest distance in the network between any two nodes of the plurality of nodes based on the spanning tree.

22. The computer program recited in claim 19, wherein the plurality of nodes comprises a plurality of processor-based computer programs, a plurality of I/O units, and a plurality of network controllers.

23. The computer program recited in claim 22, wherein the each node in the plurality of nodes communicates to all other nodes through the plurality of links connected to the plurality of switches.

24. The computer program recited in claim 23, wherein one of the processor-based computer programs of the plurality of processor-based computer programs is selected to be a master fabric manager server and another of the processor-based computer programs is selected to be a standby fabric manager server.

25. The computer program recited in claim 24, wherein the fabric manager module code segment operates in master fabric manager server and upon startup of the network configures the network by assigning a MacId value to a port of each node and identifying which of the ports are in an active mode and which are in a standby mode.

26. The computer program recited in claim 25, wherein the fabric manager module code segment on a predetermined time basis sweeps the ports which are active to determine if the ports are still able to communicate.

27. The computer program recited in claim 19, wherein the spanning tree partitioning algorithm module code segment only partitions the network into the first tree and the second tree when the link failure is between two switches of the plurality of switches.

* * * * *